United States Patent [19]
Del Prete et al.

[11] Patent Number: 5,816,838
[45] Date of Patent: Oct. 6, 1998

[54] MINIATURE CARD DOCKING CONNECTOR

[75] Inventors: Stephen D. Del Prete, Rehoboth, Mass.; Lee F. Crafford, Pawtucket, R.I.

[73] Assignee: Augat Inc., Memphis, Tenn.

[21] Appl. No.: 805,270

[22] Filed: Feb. 25, 1997

Related U.S. Application Data

[63] Continuation-in-part of Ser. No. 674,445, Jul. 2, 1996.

[51] Int. Cl.⁶ .................................................. H01R 13/62
[52] U.S. Cl. ............................................................ 439/326
[58] Field of Search ........................... 439/326, 71, 341, 439/376, 66, 91

[56] References Cited

U.S. PATENT DOCUMENTS

| | | | |
|---|---|---|---|
| 5,224,873 | 7/1993 | Duffet et al. | 439/326 |
| 5,395,251 | 3/1995 | Rodriguez et al. | 439/326 |
| 5,613,866 | 3/1997 | Niimura | 439/326 |

*Primary Examiner*—Gary F. Paumen
*Assistant Examiner*—Tho D. Ta
*Attorney, Agent, or Firm*—Weigarten, Schurgin, Gabnebin & Hayes LLP

[57] ABSTRACT

A miniature card docking connector which includes an interface connector and a frame section which are mounted on a printed circuit board. The frame is formed to partially enclose the interface connector and a miniature card. The frame includes a resilient latch mechanism for securing the miniature card in place within the frame, and a plurality of pilot retainers with latches disposed thereon for initially locating the frame on the printed circuit board. The latch mechanism may be formed as part of the frame or as a seperate piece. Integral, threaded nut portions are also provided in the frame to facilitate more permanent connection of the frame to the printed circuit board by means such as bolts.

19 Claims, 17 Drawing Sheets

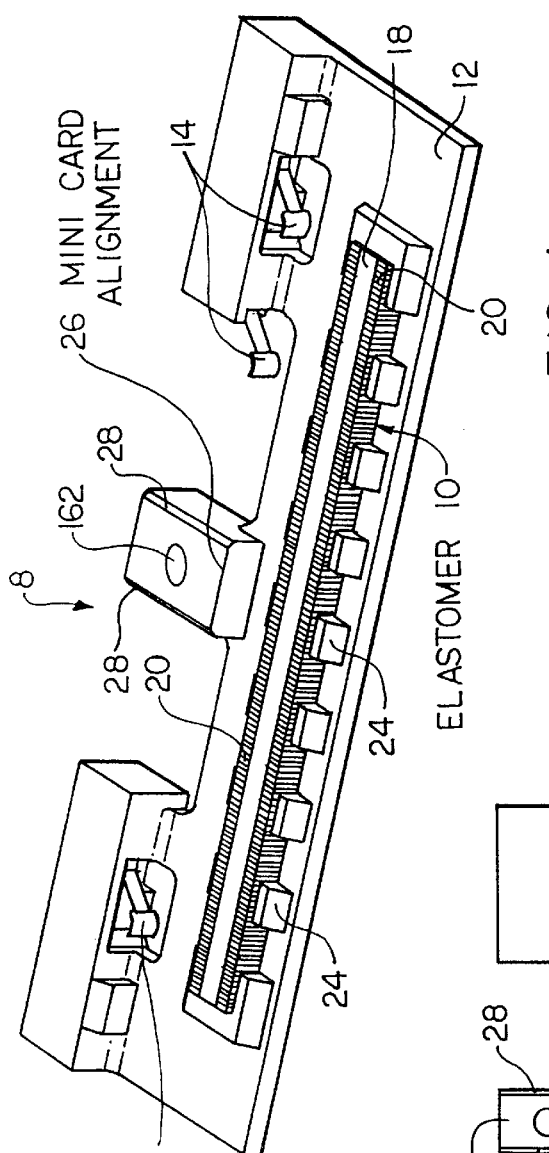
FIG. 1
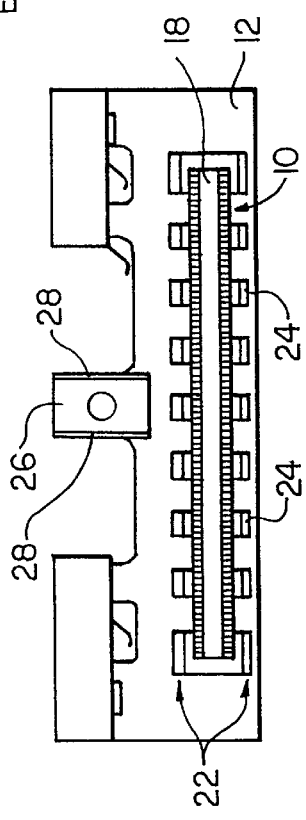
FIG. 2
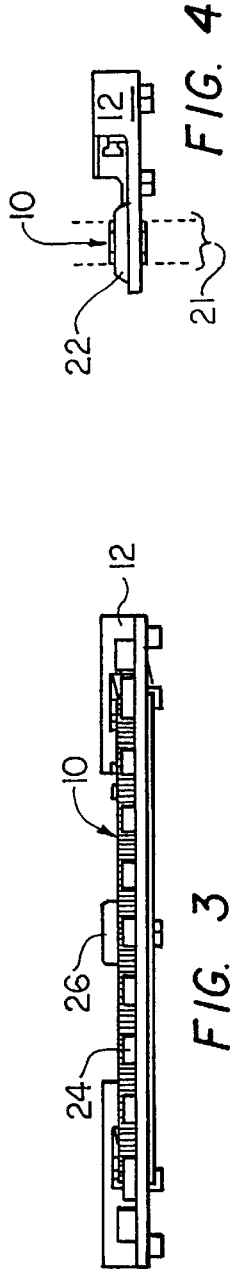
FIG. 4
FIG. 3

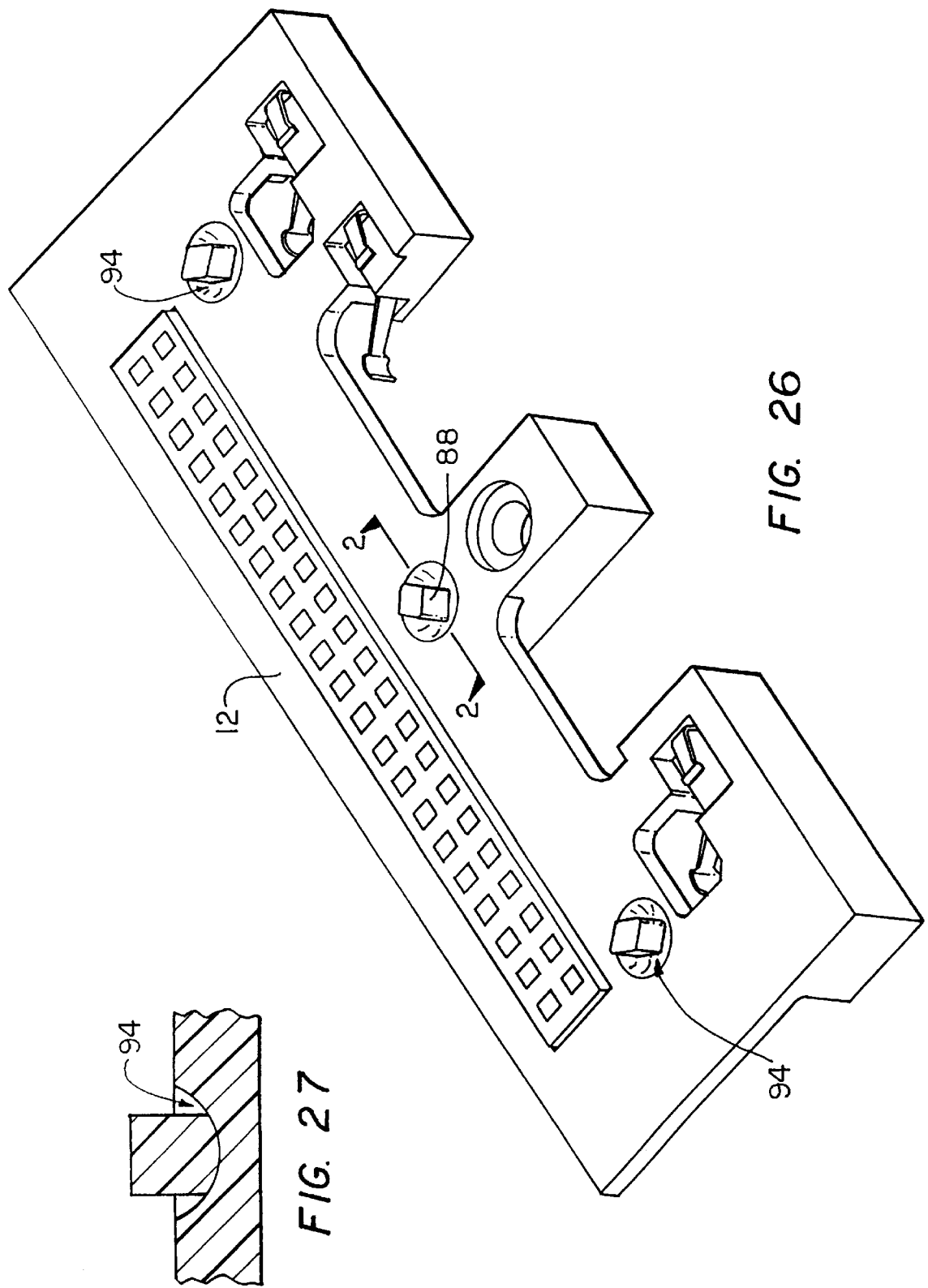

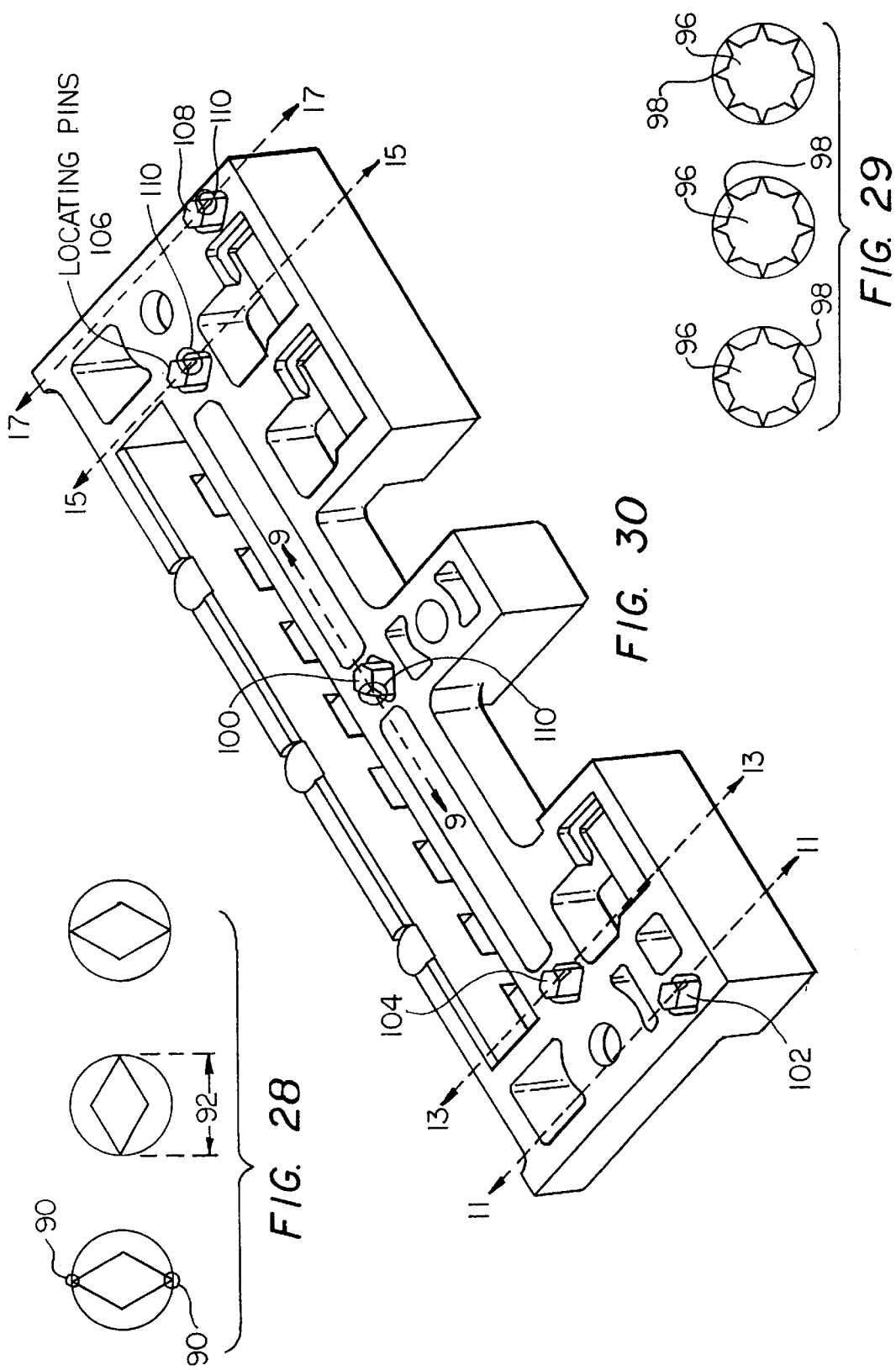

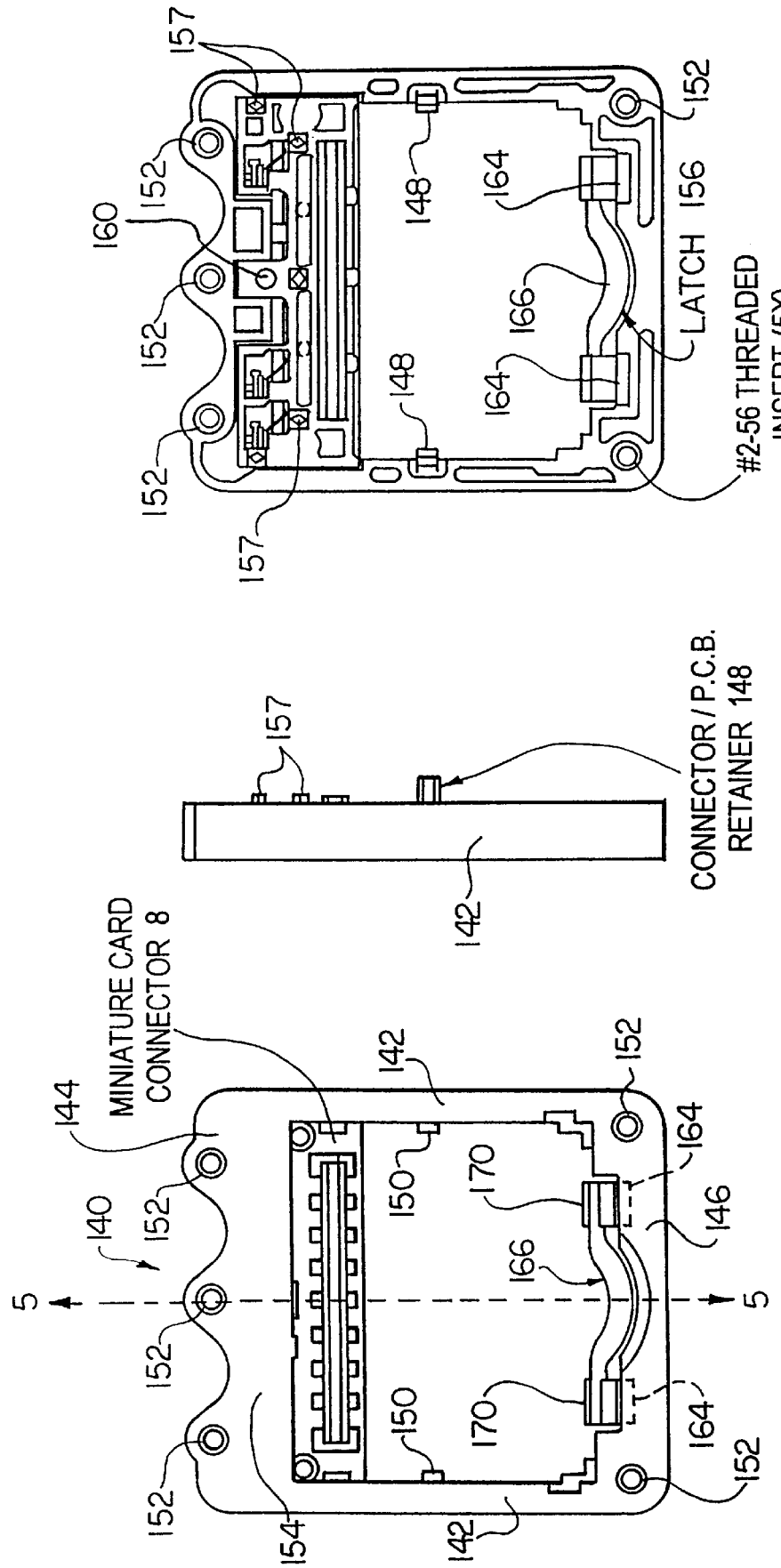

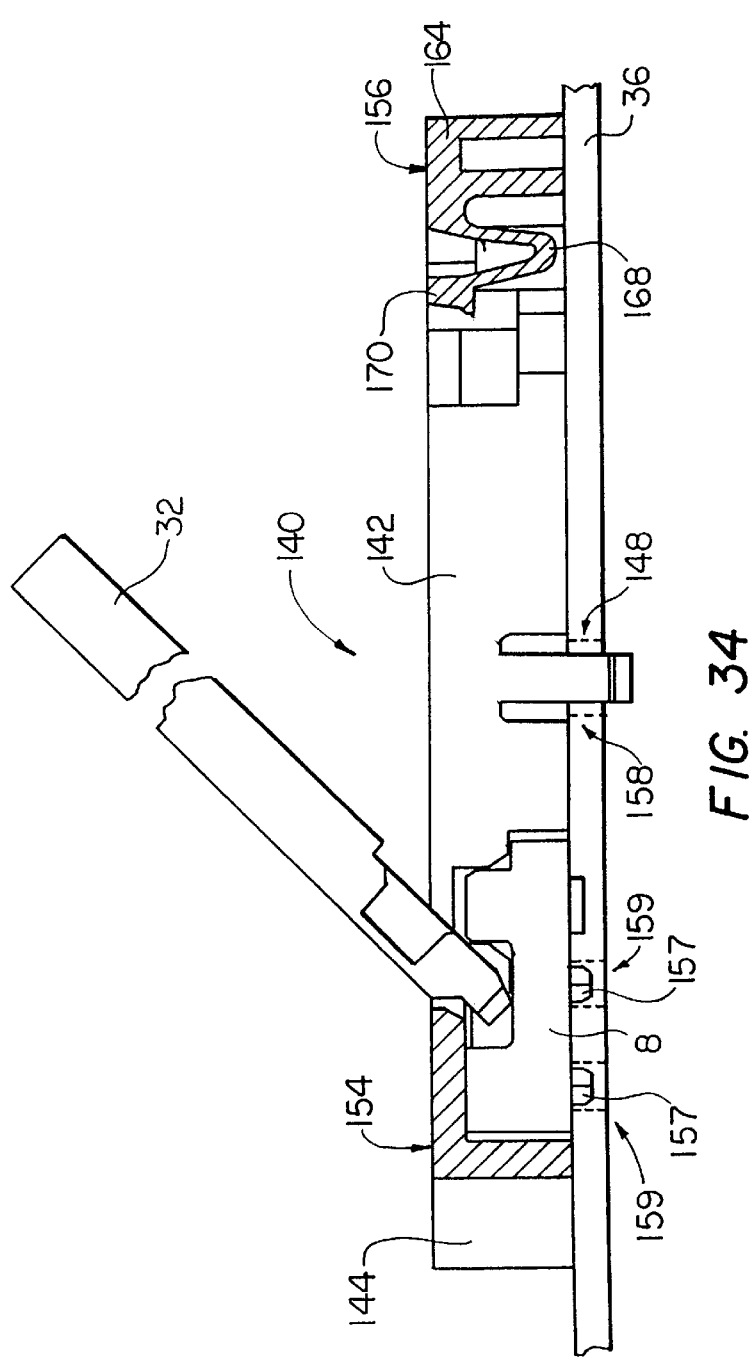
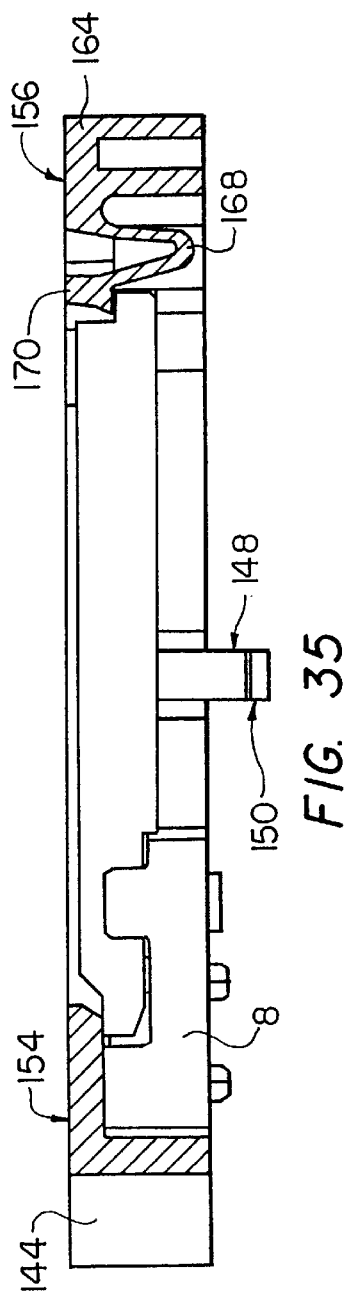
FIG. 34
FIG. 35

MINIATURE CARD DOCKING CONNECTOR

CROSS REFERENCE TO RELATED APPLICATIONS

This application is a continuation-in-part of application Ser. No. 08/674,445 entitled MINIATURE CARD INTERFACE CONNECTOR, filed Jul. 2, 1996.

STATEMENT REGARDING FEDERALLY SPONSORED RESEARCH OR DEVELOPMENT

Not Applicable

BACKGROUND OF THE INVENTION

The use of removable, self-contained electronic devices, such as flash memory cards, is known. Such devices offer advantages because of their relatively convenient size, typical plug and play compatibility and ease of removal, among other things. Such devices may be used, for example, in digital cameras. However, these advantages are dependent on providing reliable electrical connection between the removable device and the host device. It is therefore desirable to have a reliable and easy to use interface device for connecting removable devices to host devices.

BRIEF SUMMARY OF THE INVENTION

In accordance with the present invention, a miniature card docking connector includes an interface connector and a frame which are mounted on a printed circuit board. The frame is formed to partially enclose the interface connector and a miniature card. In particular, the frame includes an overhang wall which secures the forward portion of the miniature card. A resilient latch mechanism facilitates securing the miniature card within the frame. The latch mechanism includes two retaining members connected to a release mechanism that can be pressed to release the miniature card from the frame, and may be either formed as part of the latch mechanism or as a seperate piece. The frame includes a plurality of pilot retainers with latches disposed thereon for initially locating the frame relative to pre-drilled holes in the printed circuit board. In particular, the pilot retainers are inserted into the pre-drilled holes such that the latches on the pilot retainers secure against the opposite side of the printed circuit board relative to the frame. Integral, threaded nut portions are provided in the frame to facilitate more secure connection of the frame to the printed circuit board by means such as bolts.

The interface connector functions to connect the miniature card to a host device and includes an elastomeric connection device having top and bottom surfaces and electrical contacts which provide an electrical pathway between the top and bottom surfaces; and an insulating body with an opening adapted to receive the elastomeric connection device, the insulating body being further adapted to be received by the host and to receive the miniature card such that the elastomeric connection device provides electrical connection between corresponding electrically conductive pads on the miniature card and the host. The insulating body also includes a castellated sidewall disposed around the elastomeric connection device. The castellated sidewall shields the elastomeric connection device from foreign objects which might be inserted into the connector. The insulating body may also include an alignment feature for facilitating proper alignment of the connector with regard to the host device, and a keying feature for preventing connection of incompatible miniature cards to the host.

The present invention provides advantages related to both reliability and size. Improved reliability is provided by employing the elastomeric connection device rather than a traditional pin and socket type connector. The elastomeric connection device offers multiple contact points and multiple conductive paths for each connection. Further, the elastomeric connection device is rugged and does not use fragile pins which may bend or break when placed under strain. The interface connector and miniature card of the present invention are also smaller in size than corresponding PCMCIA components, and thus offer advantages normally associated with smaller size. Additionally, the interface connector and miniature card are well suited to use with modern flash memory components.

Various types of location pins may be used to provide secure alignment between the interface connector and the host device. More particularly, the interface connector may include pins with diamond-shaped cross-sections sized to fit into circular holes in the host device. An interference fit is provided because two point-contact edges of each, pin contact sidewalls of the corresponding hole. Alternatively, the pins may have circular-shaped cross-sections and include radial ribs to provide a plurality of contact points when inserted into the hole. These designs provide positive alignment with increased tolerance for manufacturing process variations prior to insertion.

The keying feature of the present invention prevents incompatible miniature cards from being connected to the host. More particularly, the interface connector may employ an insert having at least one tab portion extending toward the miniature card. When a compatible miniature card is inserted, gaps on the miniature card mesh with the tabs on the insert, thereby allowing the miniature card to be connected to the host. However, when an attempt is made to insert an incompatible miniature card, the tabs on the insert physically block the non-matching gaps on the incompatible miniature card, thus preventing connection. Different inserts having different tab configurations can be employed for different types of miniature cards. The keying feature can be advantageously used to prevent damage which might be caused by voltage mismatches, such as from inserting a +3V powered miniature card into a +12V supplying host.

BRIEF DESCRIPTION OF THE SEVERAL VIEWS OF THE DRAWING

The invention will be more fully understood from the following Detailed Description and the Drawing, in which:

FIG. 1 is a perspective view of a miniature card interface connector in accord with the present invention;

FIG. 2 is a plan view of the interface connector of FIG. 1;

FIG. 3 is a front view of the interface connector of FIG. 1;

FIG. 4 is a side view of the interface connector of FIG. 1;

FIGS. 25–30 illustrate location pins;

FIG. 31 is a top view of an alternative frame;

FIG. 32 is a side view of the frame of FIG. 31;

FIG. 33 is a bottom view of the frame of FIG. 31;

FIG. 34 is a cross-sectional side view of the frame of FIG. 31 taken along line 5—5, which illustrates the latch prior to insertion of the miniature card;

FIG. 35 is the cross-sectional view of FIG. 34 illustrating the latch after insertion of the miniature card;

DETAILED DESCRIPTION OF THE INVENTION

Figure 5:
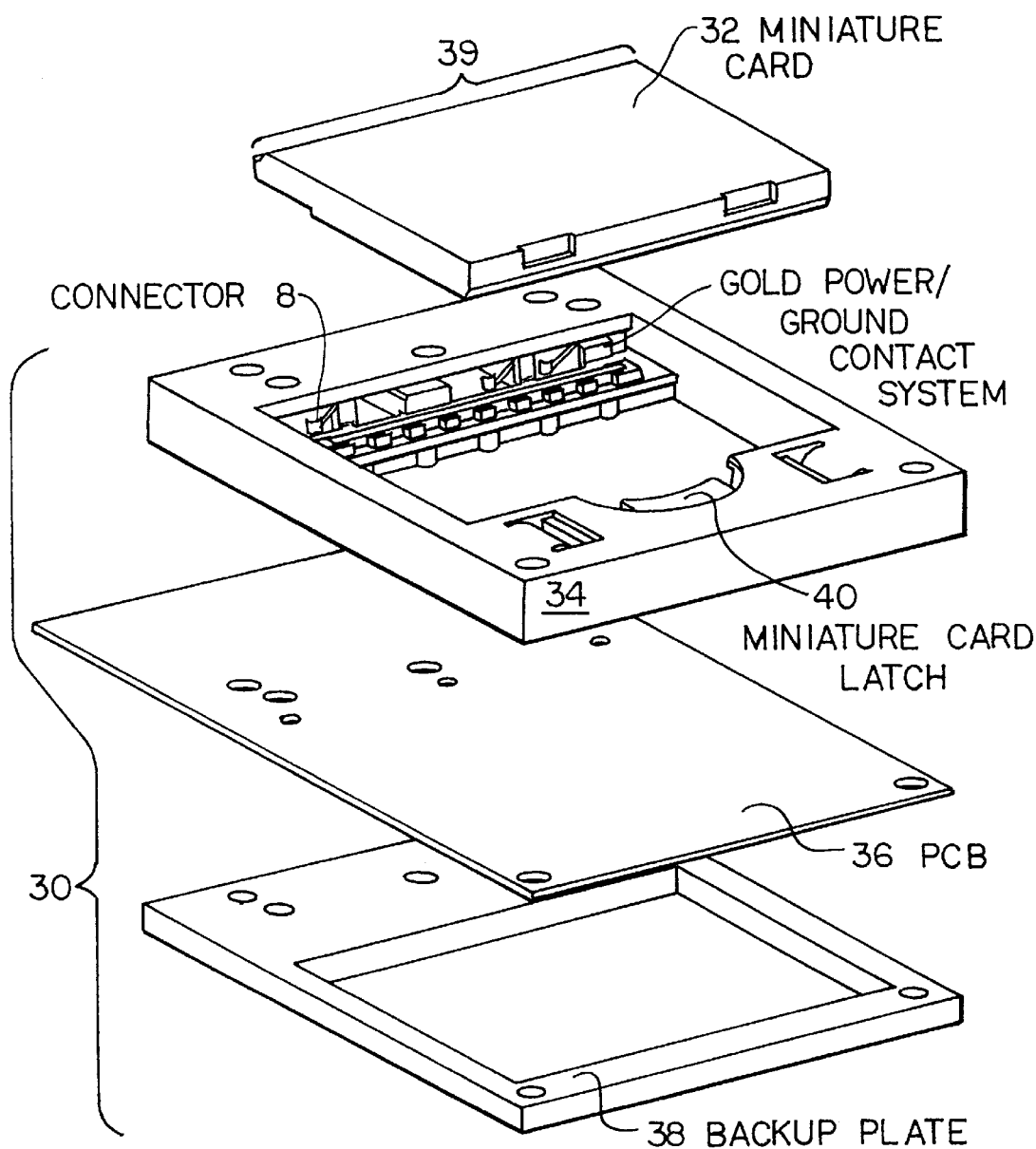
FIG. 5 is an exploded view of the interface connector in relation to a miniature card and host.

FIG. 1 illustrates an interface connector 8 for use with a host and a miniature card. The interface connector includes an elastomeric connection device 10, an electrically insulating body 12, ground contacts 14 and a power contact 16. The elastomeric connection device 10 extends through the insulating body 12 and includes an elastomeric insulator 18 and one or more rows of independent conductive contacts 20 situated therein. The conductive contacts extend through the elastomeric insulator, and thus through the insulating body.

Referring to FIGS. 1–4, the insulating body 12 includes an opening 21 (See also FIG. 11) which extends through the insulating body and is adapted to receive the elastomeric connection device 10 and allow the upper and lower surfaces of the elastomeric connection device to connect with a miniature card and host, respectively. The opening is crowned by a side wall 22 which includes a plurality of castellations 24. The opening has a width dimension which is smaller than a characteristic (non-deflected) width dimension of the elastomeric connection device prior to insertion into the opening. As such, frictional force between the castellated side wall and the elastomeric connection device operate to secure the elastomeric connection device in place, and thus prevent the connector from falling out of the opening. Alternatively, the elastomeric connection device may be secured in place with an adhesive or other means known in the art.

The castellated side wall 22 is employed to support the elastomeric connection device 10 and to decrease the likelihood of foreign objects coming into contact with the elastomeric connection device. The castellations are separated by gaps. The miniature card may include a corresponding castellated wall with castellations which, when the miniature card is properly aligned with the interface connector, interface with the interface connector gaps such that the miniature card castellations do not physically contact interface connector castellations.

The interface connector may include an alignment feature such as a post 26 for facilitating proper alignment of the miniature card with respect to the interface connector. The post is disposed centrally on the interface connector and is formed as part of the insulating body. The post includes beveled edges 28 and is shaped to snugly interface with a cutaway section on the miniature card.

Figure 6:
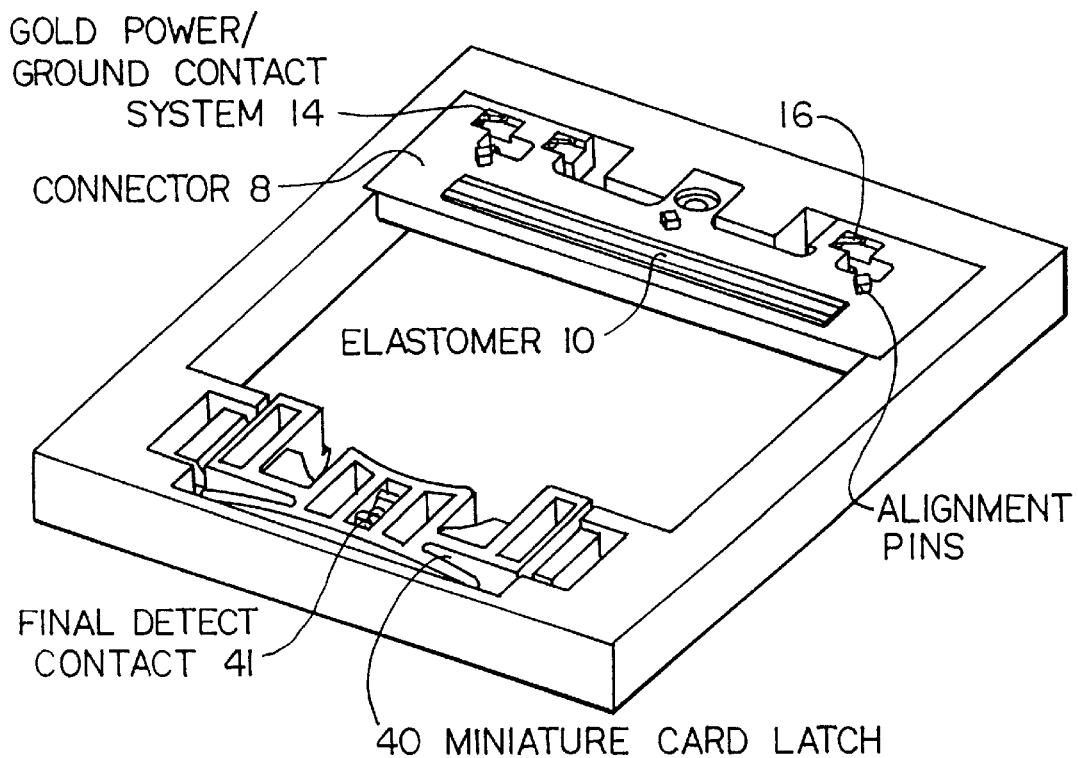
FIG. 6 is a perspective view of the bottom of the interface connector and frame of FIG. 5.
Figure 7:
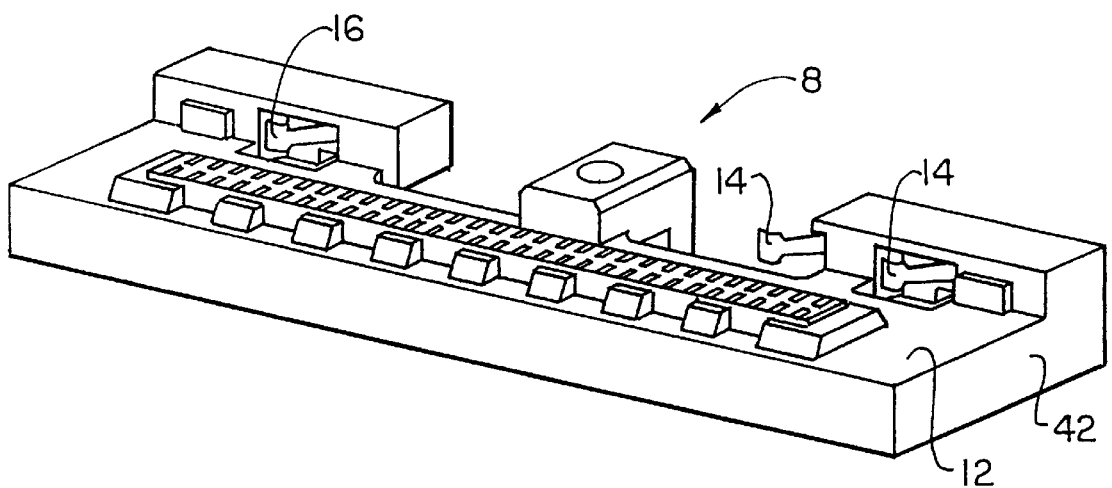
FIG. 7 is a perspective view of a high profile interface connector.
Figure 8:
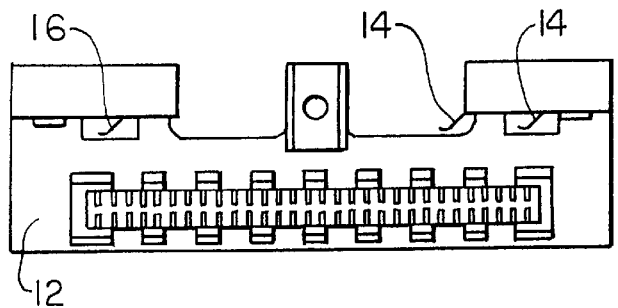
FIG. 8 is a plan view of the high profile interface connector.
Figure 9:
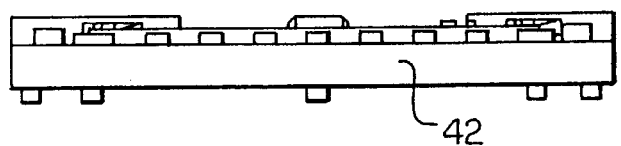
FIG. 9 is a front view of the high profile interface connector.
Figure 10:
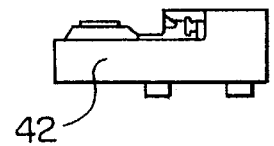
FIG. 10 is a side view of the high profile interface connector.

FIGS. 5–6 illustrates the interface connector 8 in relation to a host device 30 and a miniature card 32. The host includes a frame 34, a printed circuit board ("PCB") 36 and a backup plate 38. The PCB is sandwiched between the backup plate and the frame, which are secured by bolts of other suitable means.

The frame 34 is formed to receive the miniature card after receiving the interface connector. More particularly, the frame and the PCB form a recess into which the miniature card is securely placed. The miniature card includes a forward portion 39 which fits between the interface connector and the frame. Contacts which correspond to ground and power contacts on the interface connector are disposed on the forward portion of the miniature card. The miniature card also includes a PCB having one or more rows of electrically conductive pads corresponding to the contacts of the elastomeric connection device. The host device similarly includes a PCB with corresponding power and ground contacts, as well as rows of electrically conductive pads for transmission of signals through the elastomeric connection device. A rear portion of the miniature card includes at least one surface which is secured by a latch 40 in the frame when the miniature card is inserted therein.

Electrical connections other than power and ground e.g., data lines, are provided via the elastomeric connection device 10. Typically, both the host 30 and the miniature card 32 include PCBs with rows of corresponding connection pads. Corresponding pads must be placed in electrical communication for proper operation. When the interface connector is inserted into the host, the lower surface of the elastomeric connection device deflects against the host pads. When the miniature card is subsequently inserted into the frame, the upper surface of the elastomeric connection device deflects against the miniature card pads. The host and miniature card are thus placed in electrical communication, and a PCB to PCB connection is provided through the elastomeric connection device.

The interface connector provides connection between the miniature card and interface device in a manner which is conducive to plug and play functionality. Because the castellated sidewall 22 is raised above the surface of the insulating body 12, the miniature card must be inserted in an angular fashion. When the miniature card power and ground contacts are pressed against the interface connector power and ground contacts 16, 14, the miniature card can then be pivoted downward until the corresponding rows of pads on the miniature card and host are in electrical communication, and the miniature card is secured in place by the latch 40. Thus, the miniature card power and ground contacts enter electrical communication with the host device before the data lines, as is desirable for plug and play functionality.

In order to provide an indication when a miniature card is inserted into the frame 34, a final detect contact 41 may be employed. The final detect contact is a metal beam with two high points. The contact 41 is heat staked to the plastic latch 40, and moves therewith as miniature cards are inserted into and removed from the frame. When the frame is mounted on the PCB 36 the high points of the final detect contact deflect against the surface of the PCB. Pads disposed on the PCB surface are employed to detect the position of the contact 41, and thus determine whether a miniature card is present in the frame. For example, the final detect contact can be aligned to form a short between the pads on the PCB in the presence of a miniature card in the frame, and to form an open between the pads in the absence of the miniature card.

In an alternative embodiment illustrated in FIGS. 7–10 the interface connector is configured for a deeper frame. The high profile interface connector 8 includes a deeper base 42 which may be constructed of solid polycarbonate. The base provides increased height for use with alternative configuration frames and miniature cards.

Figure 11:
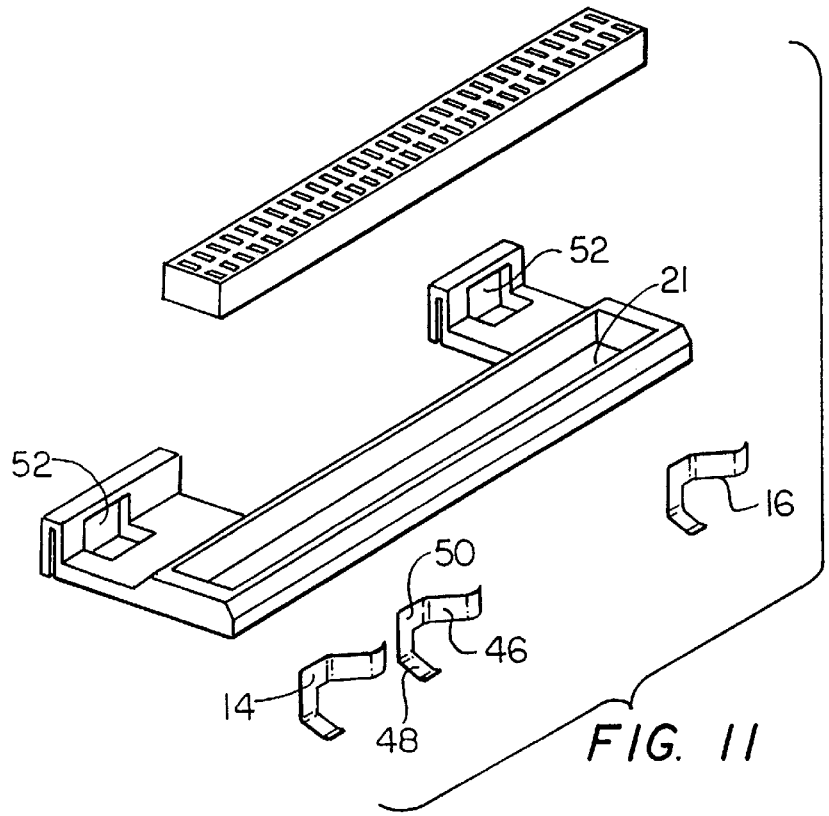
FIG. 11 is an exploded perspective view of the interface connector illustrating the horizontally deflecting power/ground contacts.
Figure 12:
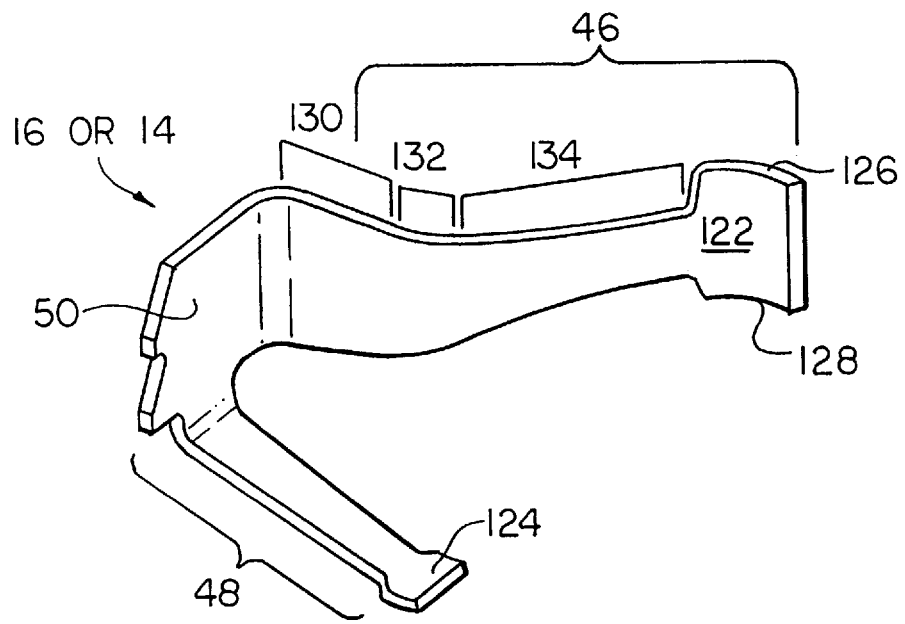
FIG. 12 is a perspective view of the horizontally deflecting power/ground contacts.
Figure 13:
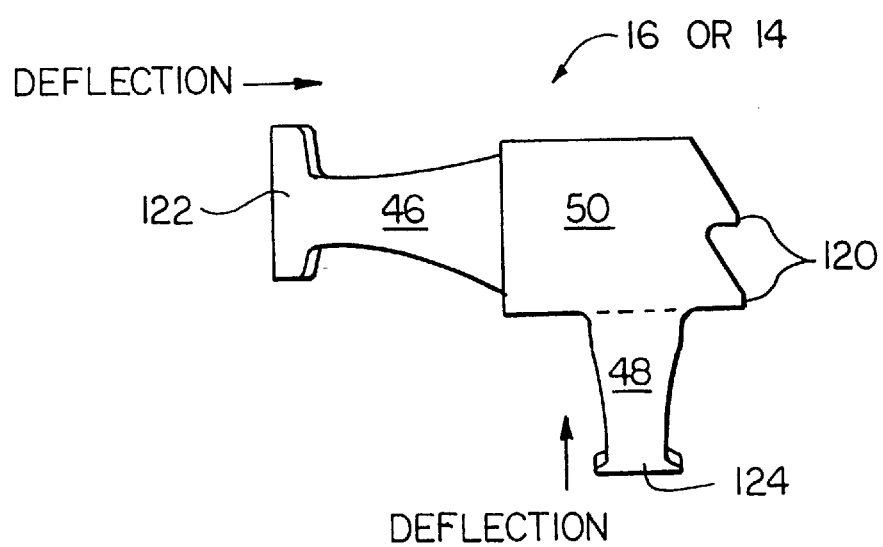
FIG. 13 is a side view of the horizontally deflecting power/ground contacts.
Figure 13A:
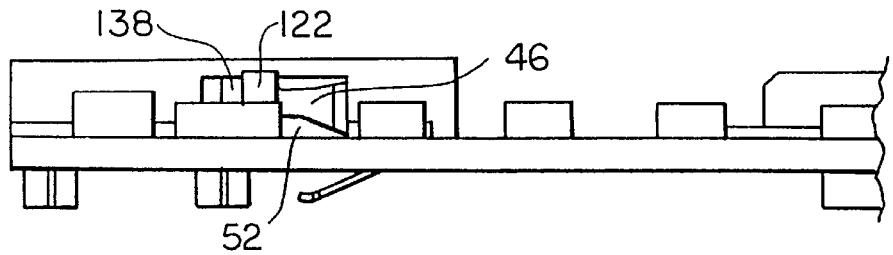
FIGS. 13a–13c further illustrate features of the power/ground contacts of FIGS. 12–13.
Figure 13B:
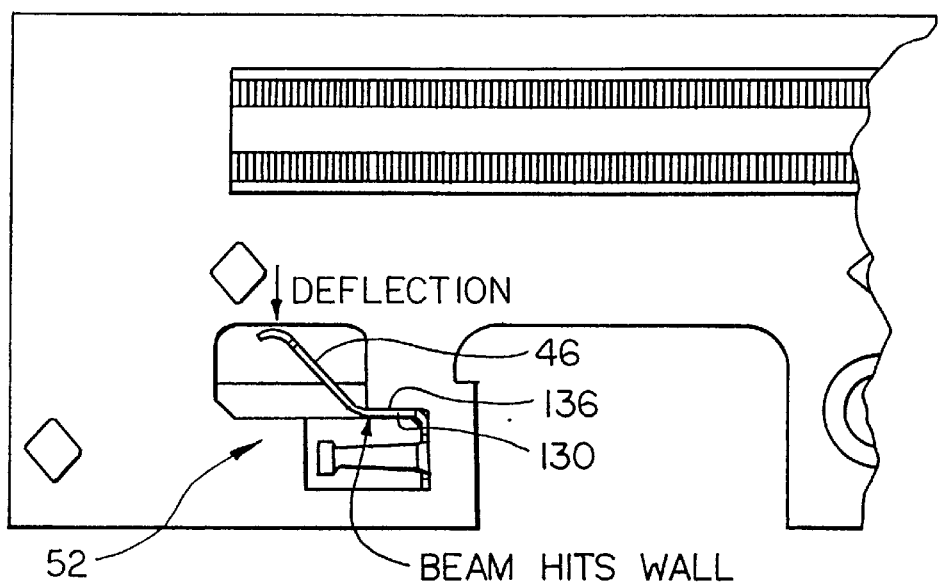
Figure 13C:
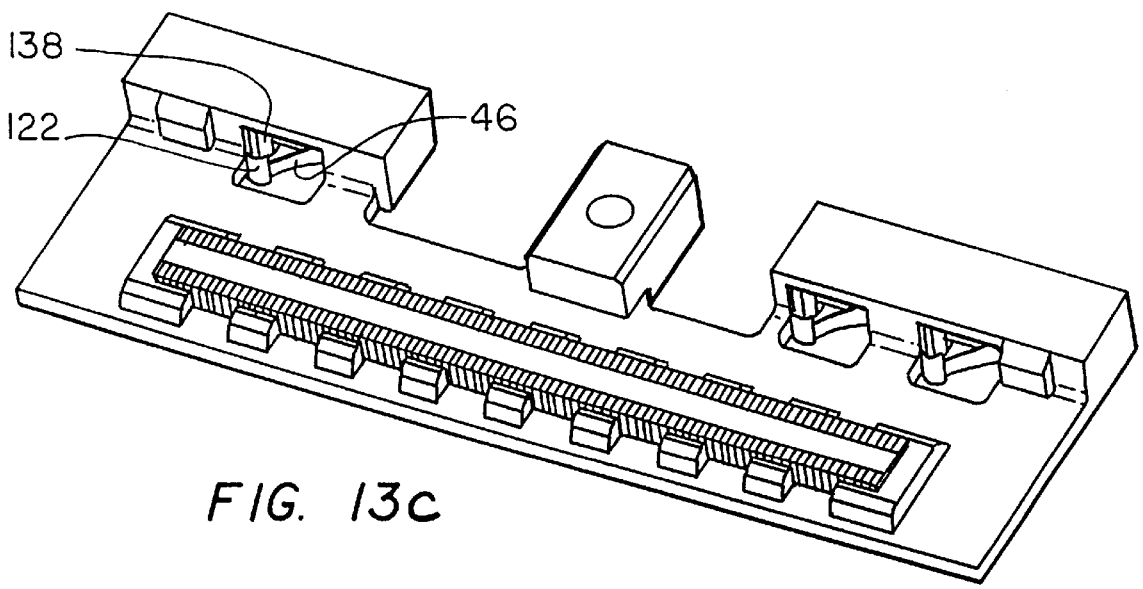
Figure 14:
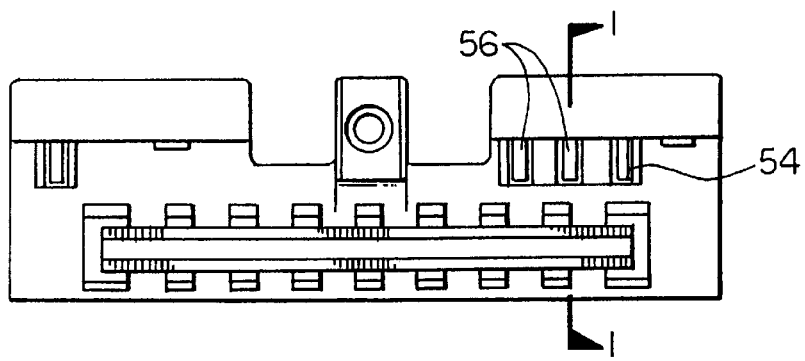
FIG. 14 is a top view of an interface connector having vertically deflecting power/ground contacts.
Figure 16:
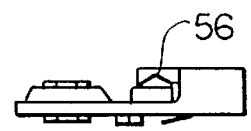
FIGS. 16–19 further illustrate vertically deflecting power/ground contacts.
Figure 15:
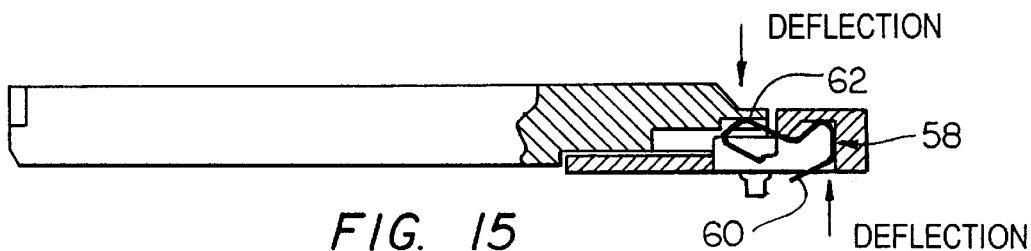
FIG. 15 is a cross sectional view of the interface connector of FIG. 14 and the miniature card taken along line 1—1.
Figure 17:
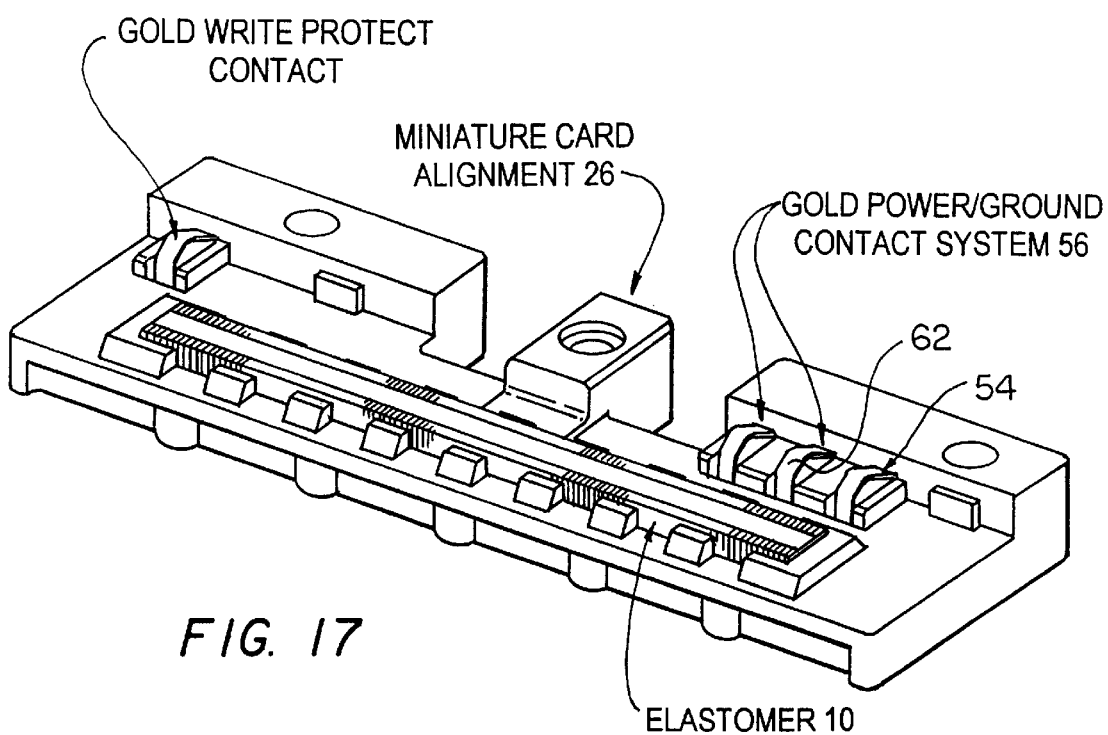
Figure 18:
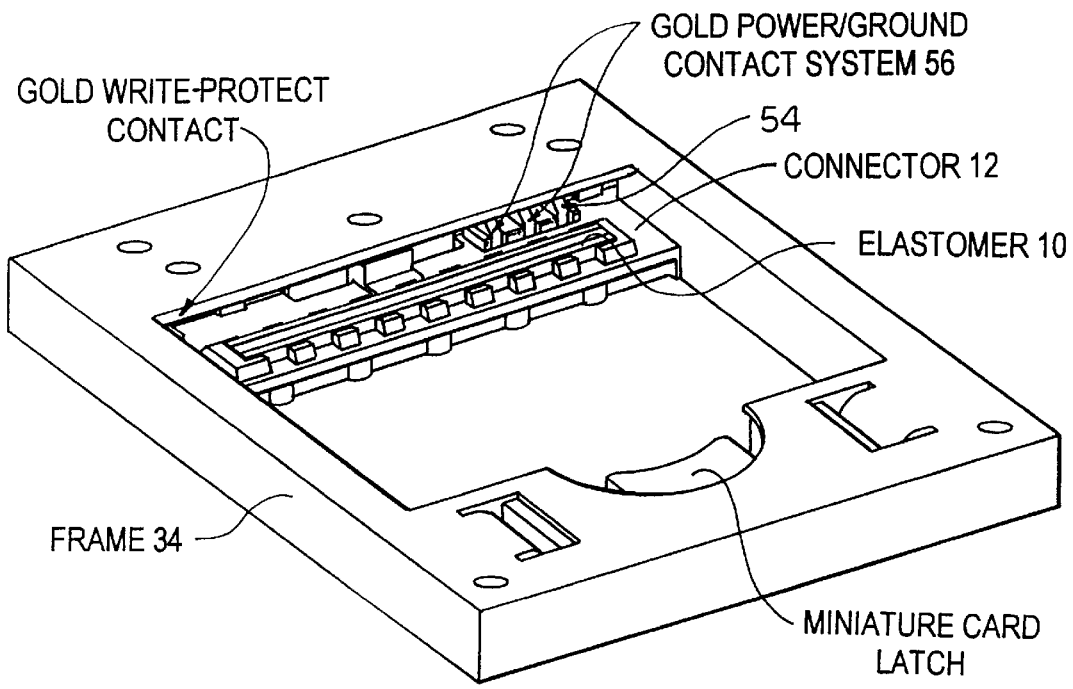
Figure 19:
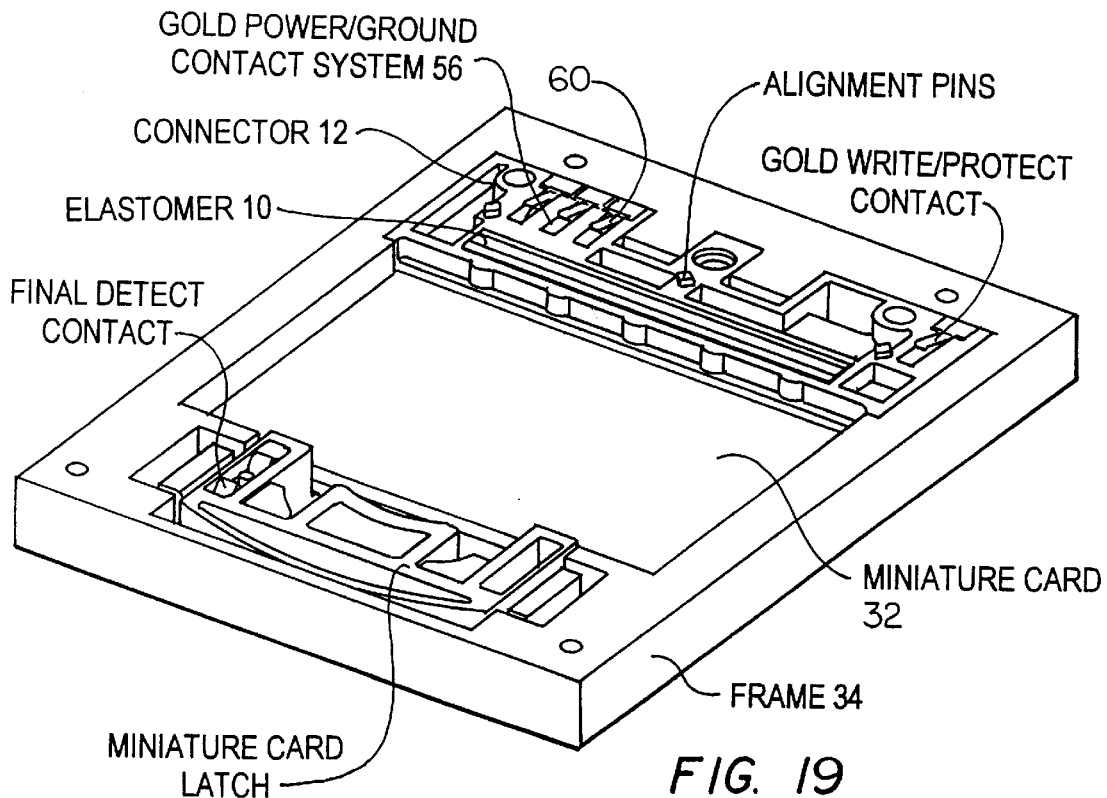

The power and ground connectors 16, 14 which electrically connect the miniature card to the interface connector are illustrated with greater detail in FIGS. 11–13. The power and ground connectors each include an upper arm section 46 and a lower arm section 48 which are connected at an intersection 50 surface. The lower arm 48 extends downward from the intersection 50 and is curved away therefrom. The upper arm 46 extends outward to one side of the intersection 50 and curves away therefrom such that when the connector is placed in the slot 52 in the insulating body, the upper arm 46 extends out of the slot 52 with sufficient space for deflection, and the lower arm 48 extends below the insulating body with sufficient space for deflection as the interface connector is secured in the frame. In operation, the upper arm 46 electrically connects to contacts on the miniature card by deflecting horizontally as force is applied thereagainst. The lower arm 48 deflects vertically against pads on the host PCB. Barbs 120 which extend from the intersection surface 50 facilitate securing the connector in the interface connector slot by anchoring against the slot walls. The connectors may be fashioned from a single piece of conductive metal by stamping or other suitable techniques known in the art.

Referring now to FIGS. 12, 13, 13a, 13b, 13c, the power and ground connectors have features which facilitate reliable operation. The upper and lower arms each include an enlarged contact surface 122, 124 at the respective ends thereof opposite the intersection 50 surface. The enlarged contact surfaces provide a relatively large surface area for achieving electrical connection with corresponding pads on the miniature card and host PCB, thereby improving reliability. Further, the upper enlarged contact surface includes an anti-overstress feature. The upper contact surface 122 includes first and second arcuate edges 126, 128, respectively. To alleviate overstress during deflection, the first edge 126 has a greater length than the second edge 128. The upper arm 46 also includes three radii 130, 132, 134 which deflect at different rates. Further, the slot 52 window through which the upper arm extends in the interface connector is formed with a wall 136 to support the first radius 130 during deflection in order to alleviate overstress and to provide greater contact force against the corresponding pad on the miniature card PCB. An anti-overstress surface 138 in the window prevents the upper arm from being deflected past a given point within the window. More particularly, the enlarged contact surface 122 contacts the anti-overstress surface 138 when the upper arm 46 is fully deflected, and the upper arm is prevented from deflecting further by the anti-overstress surface which blocks the path of further deflection.

As illustrated in FIGS. 14–19, alternative power 54 and ground 56 contacts on the interface connector operate to connect corresponding contacts on the miniature card with contacts on the host by deflecting vertically against the miniature card and host device contacts. Each interface connector power and ground contact 54, 56 is formed from a ribbon-like conductive metal strip. The contacts 54, 56 include a substantially straight securing section 58 which is secured to the interface connector by insertion into the preformed slot in the insulating body. A host contacting portion 60 of the interface connector contact is located adjacent to the securing section and is operative to deflect vertically (upwards) as the interface card is placed in the host. Downward deflective force maintains contact between the host contacting portion and the corresponding host contact. A miniature card contacting portion 62 of the interface connector contact is located adjacent to the securing section 58. The miniature card contacting portion is formed into a partial loop which prevents the contact end from being damagingly jammed into the miniature card. The miniature card contacting portion 62 deflects vertically downward as the miniature card is inserted into the interface connector, and deflective force maintains electrical connection between the contacting portion and the corresponding pad on the miniature card. It will therefore be appreciated that the contacts 54, 56 deflect vertically when contacting both the host pads and the miniature card pads.

Figure 20:
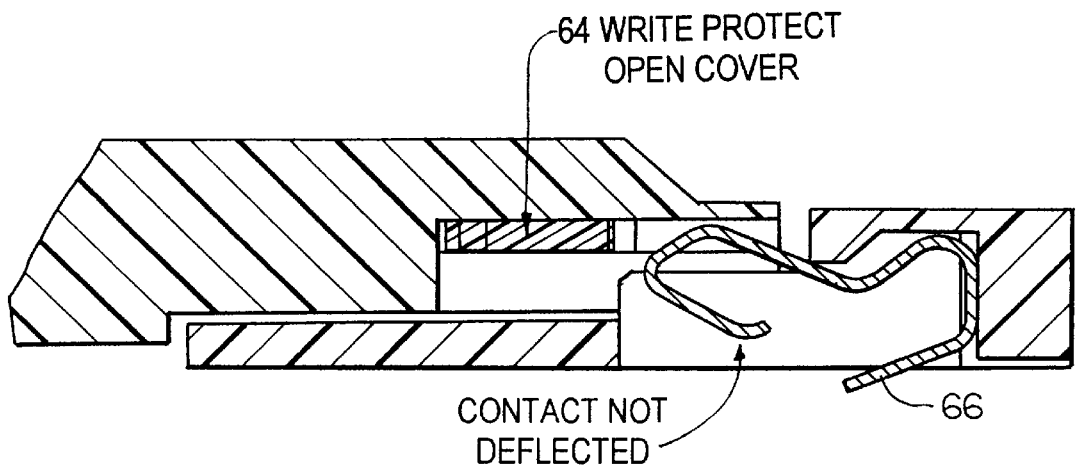
FIGS. 20–21 illustrate the write-protect feature.
Figure 21:
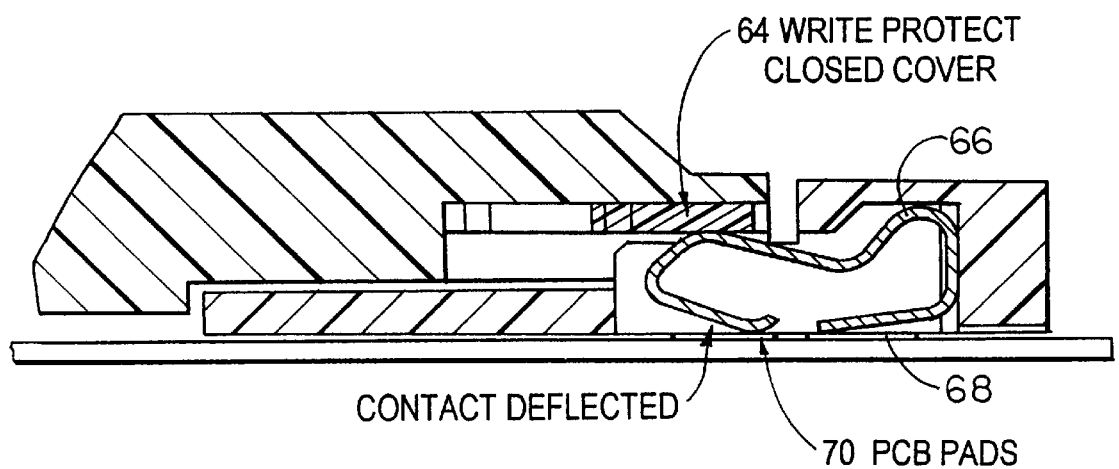

As illustrated in FIGS. 20–21, the miniature card may include a write-protect tab 64 for providing selectable write protection for writable miniature card devices. The interface connector includes a write-protect contact 66 which is normally electrically connected to a first host write-protect pad 68, i.e., the interface connector stays resident in the host. The write-protect tab 64 operates to control electrical connection between the first write-protect pad 68 and a second write-protect pad 70. The write-protect tab 64 is a nonconductive panel which can be slidably moved to deflect the write-protect contact and thereby cause the contact to electrically connect with the second write-protect pad 70. The write-protect tab can also be slidably moved away from the write-protect tab to un-deflect the contact 66 away from the second write-protect pad 70. Circuitry within the host can be utilized to prevent writing of data when a predetermined voltage potential is not present at the first write-protect pad 68.

Figure 22:
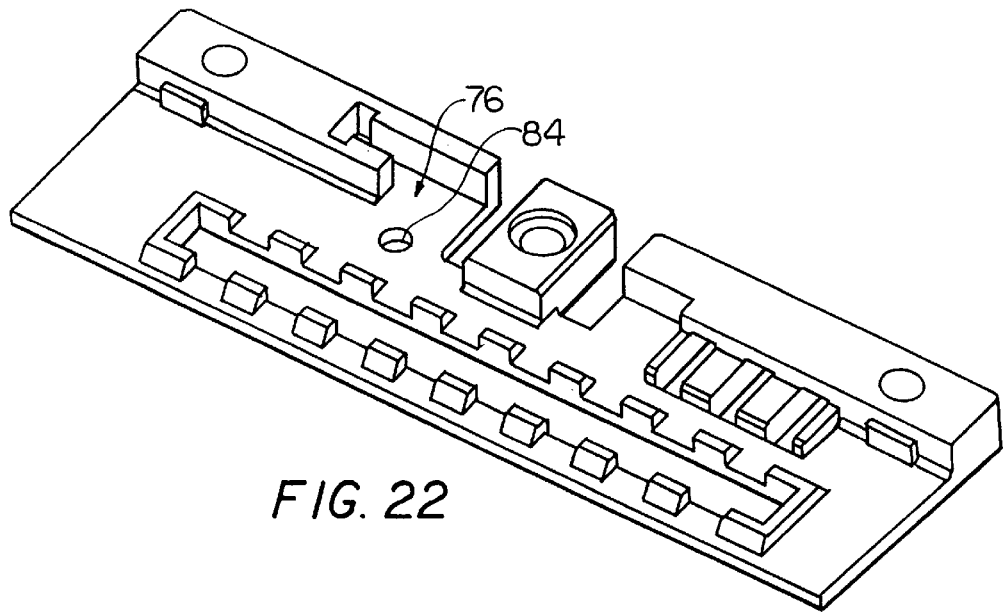
FIGS. 22–24 illustrate the keying feature.
Figure 23:
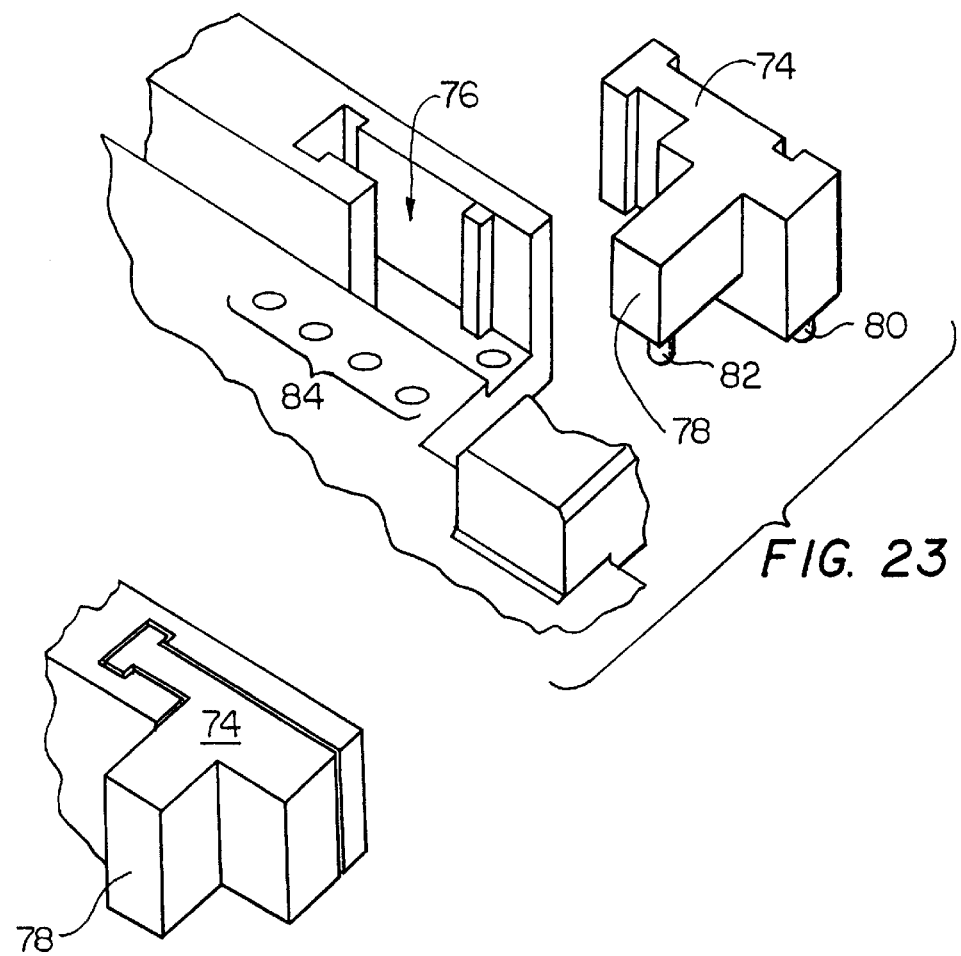
Figure 24:
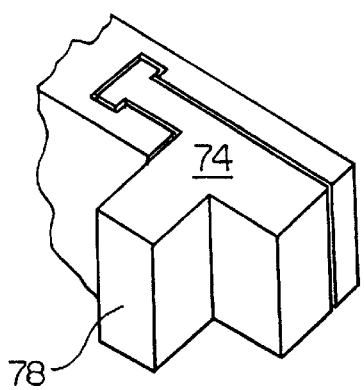
Figure 25:
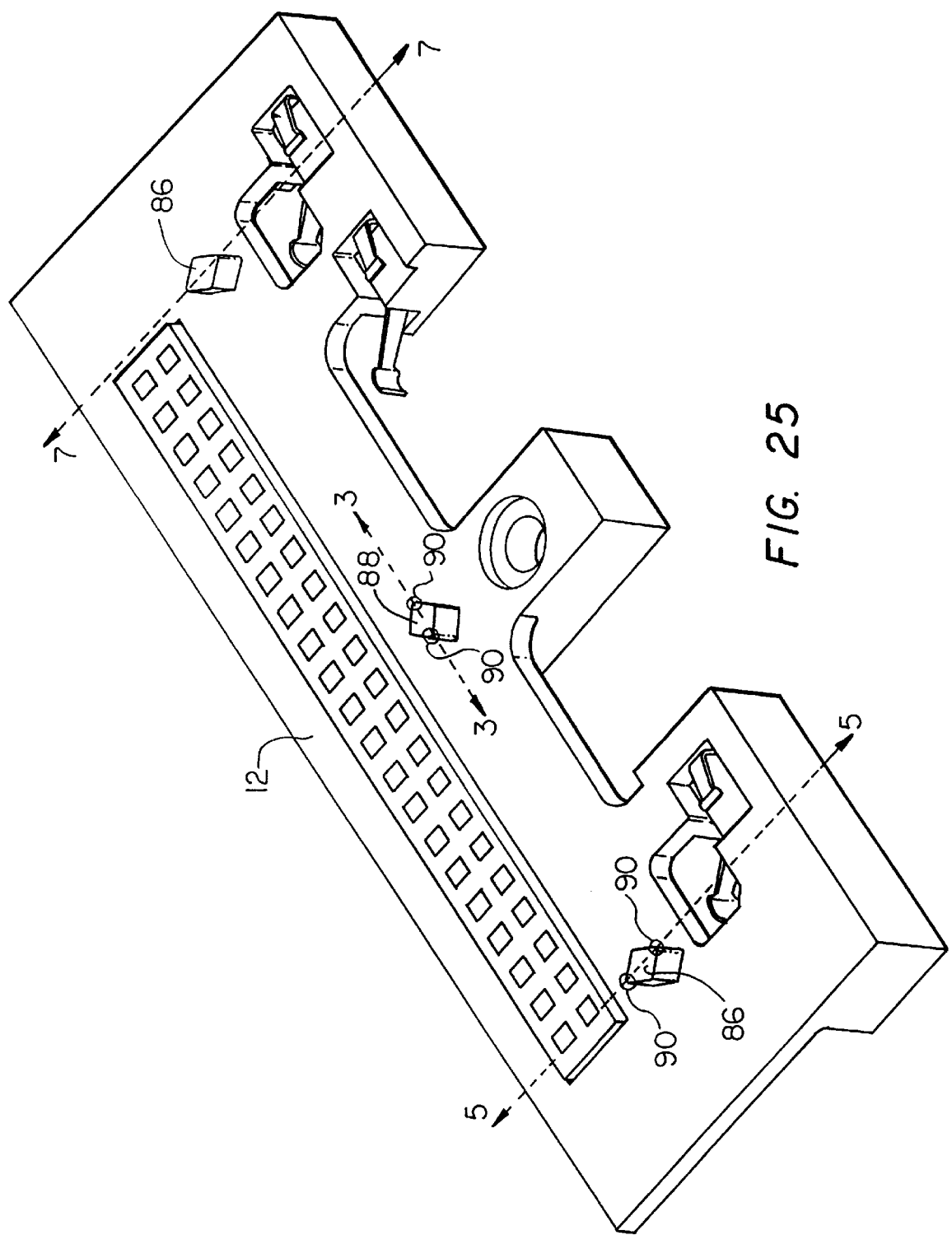
Figure 36:
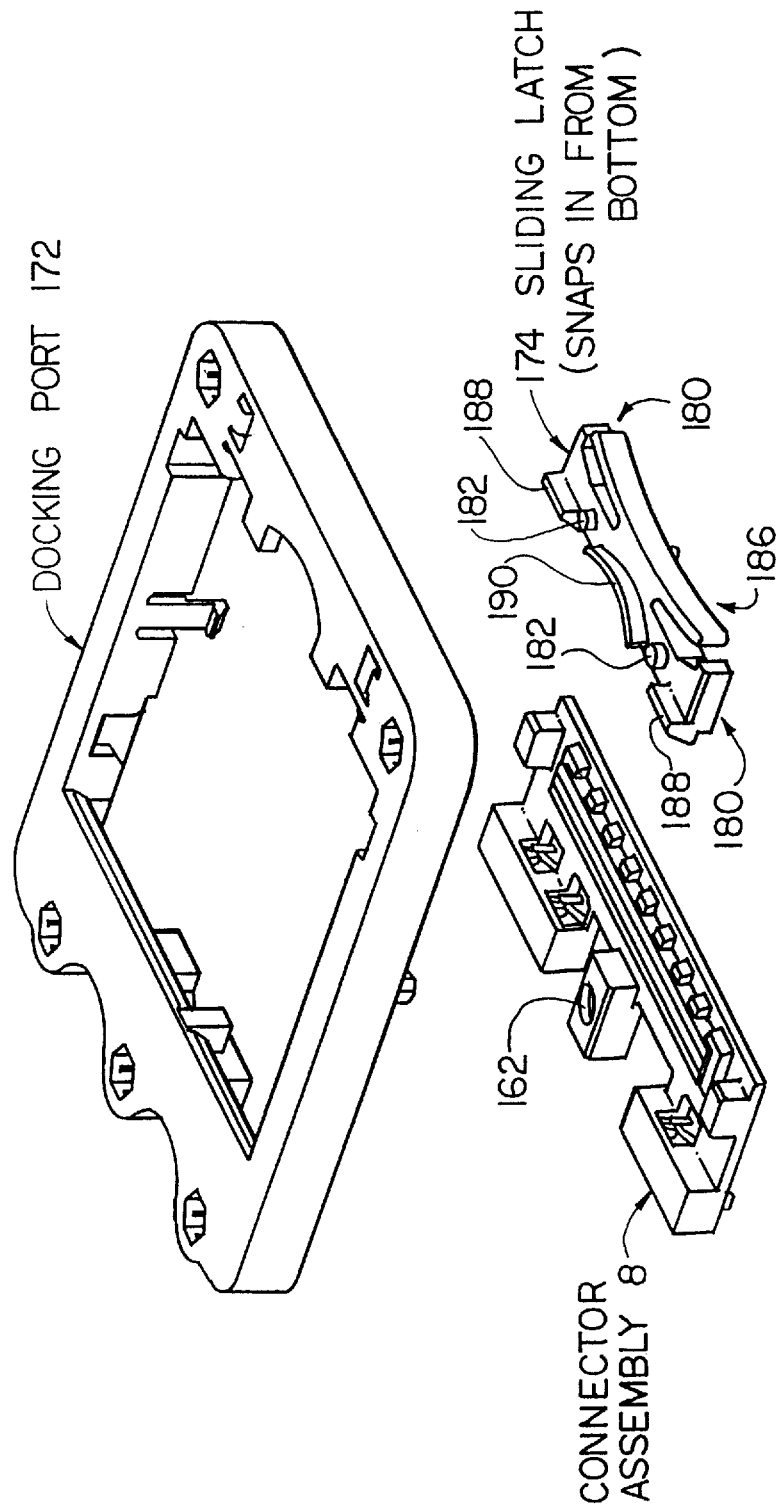
FIG. 36 is a top perspective view of a low-profile, multi-piece frame.
Figure 39:
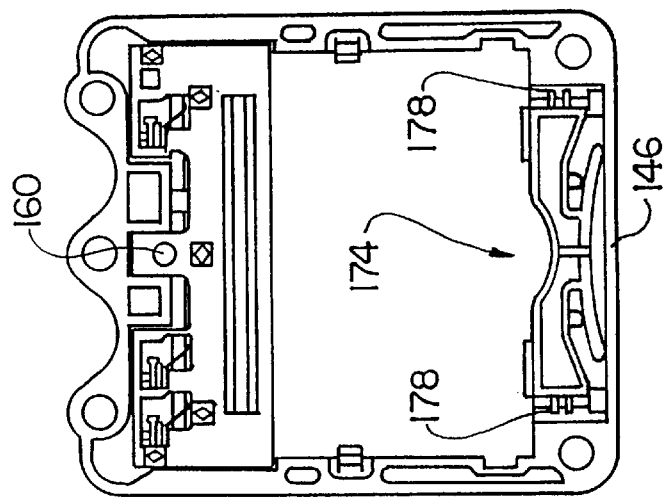
FIG. 39 is a bottom view of the frame of FIG. 37.
Figure 38:
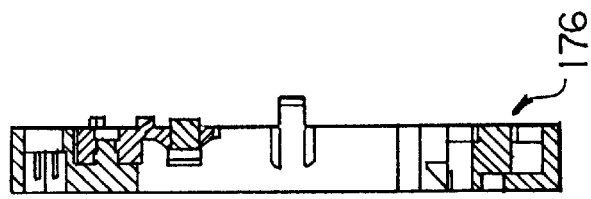
FIG. 38 is a cross-sectional view of the frame of FIG. 37 taken along line 6—6.
Figure 37:
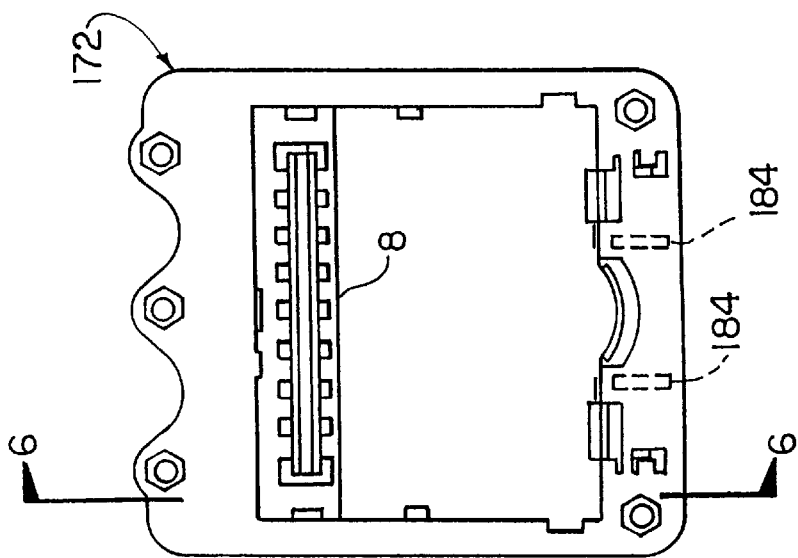
FIG. 37 is a plan view of the multi-piece frame of FIG. 36.

Referring now to FIGS. 22–23, the interface connector may also include a keying feature for selectively accepting and rejecting insertion of predetermined types of miniature cards. It is envisioned that different types of miniature cards may be configured for different voltage levels. The keying feature could be employed to, e.g., prevent insertion of a +3V flash memory miniature card into a host device which is designed for a +5V flash memory (and provides +5V at the power contacts). The keying feature employs an irregularly shaped plastic insert 74 which is shaped to fit in a corresponding irregularly shaped keyhole 76 in the insulating body. The insert includes a tab portion 78 which prevents insertion of incompatible miniature cards. The plastic insert includes a first peg 80 for aligning and securing the insert in place and a second peg 82 for aligning and securing the tab 78. The interface connector includes at least one hole 84 for accommodating tab pegs 82. Hence, a variety of tab patterns including pluralities of tabs may be accommodated such that a single design of insulating body can be customized to accept any of various compatible miniature cards, while rejecting incompatible miniature cards, by insertion of an appropriate plastic insert. Gaps on the miniature card corresponding to the tabs on the interface connector insert 74 would thereafter physically block insertion of incompatible cards in the same manner as described with respect to the keying feature 72 above.

Features which facilitate alignment of the interface connector with respect to the host device are shown in FIGS. 25–30. More particularly, the interface connector includes outer location pins 86 and a center location pin 88 disposed on the flat bottom surface. The pins have a diamond-shaped cross-section, and are adapted to interface tightly with corresponding circular holes in the host. Each location pin includes two outermost edges 90 which are separated by a length dimension 92 approximately equal to the diameter dimension of the holes. The pins and holes thereby provide a point contact, interference fit which provides proper and secure alignment with tolerance within a predetermined range of dimensional mismatch between the hole diameter and the length dimension. Such a mismatch could be caused by manufacturing tolerance variation.

The insulating body 12 may include recesses 94 around the location pins for accepting waste material produced during assembly. When the pin is inserted into the hole during assembly, excess material at the contact point, typically a thin plastic shaving, is sheared away. In the absence of a recess such excess material could jam between the interface connector and the host, thereby inhibiting proper insertion and alignment. By forming recesses into which the pins are disposed, material shaved away during insertion of the pin into the hole is deposited in the recess and thereby does not interfere with proper insertion and alignment.

The location pins are arranged to inhibit twisting and shifting of the interface connector relative to the host. More particularly, the center pin 88 is ninety degrees out of phase relative to the other pins. The center pin 88 contact points 90 are aligned along a first axis 3—3, and the outer pin contact points are aligned along parallel axes 5—5, 7—7. This arrangement provides static positioning relative to the axes 3—3, 5—5, 7—7, and prevents rotation of the interface connector around the center pin 88.

Alternative shapes for the location pins may also be utilized. As shown in FIG. 29, alternative pins 96 may have a circular cross-section and include a plurality of radial ribs. Each radial rib can potentially form a point contact 98. Thus, greater tolerance for manufacturing process variation may be realized with an associated possible increase in force required to insert the pin into the hole. In another alternative embodiment shown in FIG. 30, five location pins are utilized. A center location pin 100 is oriented along a first axis 9—9 and outer location pins 102, 104, 106, 108 are oriented along parallel axes 11—11, 13—13, 15—15, 17—17, respectively, which are perpendicular to the first axis 9—9. Further, the location pins include bevelled point contact edges 110 which facilitate insertion of the interface connector into the host.

FIGS. 31–33 illustrate an alternative frame 140. The frame 140 includes two opposing sidewalls 142, a forward wall 144 and a rear wall 146. A printed circuit board ("PCB") pilot retainer 148 is disposed at the midpoint of each sidewall 142. Each pilot retainer 148 extends downward from its respective sidewall 142 and includes a latch 150 disposed at a distal end thereof relative to the frame 140. The forward wall 144 includes three protrusions, each having a respective threaded insert 152. An overhang wall portion 154 is disposed on the upper forward sidewall 144 such that the miniature card connector 8 is partially shielded from above once inserted into the frame. The rear wall 146 includes two threaded inserts 152 at distal ends thereof and a latch 156.

To mount the frame on a printed circuit board, pilot holes 158 are first drilled in the printed circuit board corresponding to the desired location of the pilot retainers 148. The frame is then placed vertically onto the printed circuit board such that the pilot retainers 148 are inserted into the respective holes 158 corresponding thereto. The latches 150 disposed on the distal ends of the pilot retainers deflect upon such insertion, and subsequently secure to the underside of the printed circuit board 36 when inserted fully therethrough. Bolts are then inserted through the holes in the PCB and connected to corresponding threaded inserts to more securely mount the frame on the printed circuit board.

A multi-sided post 160 is disposed on the forward wall 144 for securing the interface connector 8 in the frame while the frame is being mounted on the printed circuit board. More particularly, a multi-sided post 160 extends downward from the center of the overhang portion 154 of the forward wall. The post 160 is sized to form a press fit when inserted into an appropriately sized hole 162 (FIG. 1) disposed in post 26 (FIG. 1) of the interface connector 8. Hence, the interface connector is retained against the frame while the frame is inverted and mounted on the printed circuit board.

Locating posts 157 may be provided on the interface connector for assuring proper alignment and connection with the printed circuit board. Once the frame is mounted on the printed circuit board, the interface connector is sandwiched between the frame overhang portion 154 and the surface of the printed circuit board 36, with post 160 preventing the interface connector from moving laterally outward from between the overhang portion and printed circuit board. Further, a plurality of locating posts 157 are disposed on the lower surface of the interface connector to align the interface connector with pre-drilled holes 159 in the printed circuit board, and provide mechanical connection thereto. The posts 157 are multi-sided, with diamond-like cross-section and a diameter slightly larger than the holes 159. Hence, the posts 157 provide a press fit into the holes 159 to securely hold the interface connector in place on the printed circuit board.

Referring to FIGS. 31–35, the latch 156 includes two base members 164 and a crossbar 166 which is disposed therebetween and interconnects the base members. The base members 164 are anchored to the rear wall 146. A curved spring member 168 extends inward from each base, and is terminated by a latching member 170. The outer edge of the latching member 170 is beveled to facilitate insertion of the miniature card 32 by causing the spring members 168 to gradually deflect as the miniature card is inserted into the frame. A lower, securing edge of each latching member 170 is located at a height position within the frame corresponding to a securing edge of a fully inserted miniature card 32. When the miniature card securing edge is below the latching member securing edge, the force of the spring member moves the latching member toward the miniature card and over the miniature card securing edge, thereby securing the miniature card within the frame.

The latching members 170 are connected by the crossbar 166, thereby facilitating release of the miniature card 32 from the frame. In particular, a gap is formed between the crossbar and the rear wall such that the crossbar can be moved toward the rear wall by application of force. When such force is applied to the crossbar the latching members are moved toward the rear wall until the latching edge moves laterally beyond the securing edge on the miniature card and the miniature card is released from the frame. In order to facilitate application of force to the crossbar, the crossbar is formed with a curvature which leaves a gap between the crossbar and the fully inserted miniature card. The tip of a person's finger or other small object may then be partially inserted into the gap in order to apply force to the crossbar and release the miniature card.

To further facilitate release of the miniature card from the frame, spring-like force is constantly applied to the forward portion of the miniature card when the miniature card is secured in the frame. More particularly, when the miniature card is rotated into the frame, pressure is applied to the forward portion of the miniature card by the overhang portion of the forward wall and elastomer of the interface connector. Such pressure slightly deflects the overhang portion and elastomer such that upon release of the latching members the elastomer and overhang portion return to their original respective positions and thereby force the miniature card to pop upward out of the frame. Hence, it is not necessary to pry the miniature card out of the frame and thereby risk damage.

A low-profile, multipiece frame is illustrated in FIGS. 36–39. A docking port 172 is employed for mounting of a separately formed interface connector assembly 8 and latch mechanism 174. The interface connector 8 is mounted on the docking port 172 by a press fit between multi-sided post 160 and hole 162, as described above. The latch mechanism 174 snaps into a receiving portion of the docking port, and is secured thereto by posts 178. In particular, the posts 178 are terminated with inward facing hook portions which secure under opposing sides 180 of the latch 174 when the latch is fully inserted into the receiving portion of the docking port.

The latch 174 is slidably movable once mounted on the docking port 172. The latch 174 includes two guideposts 182 which fit into guideslots 184 formed in the docking port 172. The guideposts and guideslots allow limited, forward-rearward sliding motion of the latch, and prevent lateral and twisting motions. A flexible, curved spring member 186 is formed on the latch with two spring arms and a base portion disposed therebetween. The spring member 186 contacts the rear wall 146 of the docking port and thereby maintains the latch fully extended toward the center of the docking port, to the extent allowed by the guideposts and guideslots. When a miniature card is inserted into the docking port, the rear portion of the miniature card contacts beveled latch members 188 on the forward edge of the latch, and causes the latch to move toward the rear wall 146 of the docking port as the spring member is deflected. When the miniature card is fully inserted into the docking port the latch members extend over the top of the miniature card, held by the force of the spring member 186, thereby securing the miniature card within the docking port. A raised curvature 190 is disposed on the latch 174 to facilitate removal of the miniature card from the docking port by sliding the latch toward the rear wall 146 with a person's finger until the latch members no longer secure the miniature card.

It should be understood that the invention is not limited to the particular embodiments shown and described herein, and that various changes and modifications may be made without departing from the spirit and scope this novel concept as defined by the following claims.

What is claimed is:

1. A device which facilitates mounting of a miniature card on a printed circuit board by securing forward and rear portions of the miniature card in place, comprising:

a forward wall having first and second distal ends;

first and second parallel sidewalls connected to the forward wall at the first and second distal ends thereof, respectively;

a rear wall having first and second distal ends connected respectively to the first and second sidewalls such that the rear wall is substantially parallel with the forward wall;

a resilient overhang wall portion disposed between the forward wall and the first and second sidewalls on upper surfaces thereof;

a latch mechanism disposed on the rear sidewall, the device being positioned on the printed circuit board by securing at least two of the walls to the printed circuit board, whereby the miniature card is secured in place by positioning the forward portion of the miniature card between the overhang portion and the printed circuit board, and pivoting the rear portion of the miniature card downward until the latch mechanism engages the rear portion of the miniature card;

wherein the latch mechanism includes a plurality of slidably movable miniature card retaining members which extend over a portion of the miniature card when the miniature card is inserted between the overhang portion and the printed circuit board;

wherein the latch mechanism further includes a resilient spring member having two spring arms which, in the absence of a counter force, extends the plurality of miniature card retaining members over the portion of the miniature card when the miniature card is inserted between the overhang portion and the printed circuit board;

wherein each of the plurality of miniature card retaining members includes a planar retaining surface abutted to a beveled edge, the beveled edge operating to contact the miniature card prior to insertion between the overhang portion and the printed circuit board such that the spring member is compressed until the miniature card is fully inserted between the overhang portion and the printed circuit board, whereupon the spring member forces the retaining members outward over the portion of the miniature card; and wherein the plurality of retaining members are connected by a cross bar so that the miniature card is released by simultaneously compressing the respective spring arms associated with the retaining members by applying force to the crossbar.

2. The device of claim 1 wherein the crossbar is curved toward the rear wall between the retaining members.

3. The device of claim 1 wherein the resilient overhang portion is deflected by the miniature card when the miniature card is fully inserted between the overhand portion and the printed circuit board, and force upon the forward portion of the miniature card by the overhang portion causes the rear portion of the miniature card to pop out of rear wall when the latch is released.

4. The device of claim 1 further including first and second retainer members extending from the first and second sidewalls, respectively, the first and second retainer members each including a latch member disposed thereon such that the device can be secured to the printed circuit board by pre-drilling holes in the printed circuit board and inserting the retainer members therethrough.

5. The device of claim 1 further including a plurality of threaded holes formed in at least two walls of the forward wall, rear wall and sidewalls.

6. A device which facilitates mounting of a miniature card on a printed circuit board by securing forward and rear portions of the miniature card in place, comprising:

a frame comprising forward and rear walls connected by first and second parallel sidewalls, the forward wall having first and second distal ends, the first and second parallel sidewalls connected to the forward wall at the first and second distal ends thereof, respectively, the rear wall having first and second distal ends connected respectively to the first and second sidewalls such that the rear wall is substantially parallel with the forward wall, and a resilient overhang wall portion disposed between the forward wall and the first and second sidewalls on upper surfaces thereof;

a latch mechanism secured to the frame, the device being positioned on the printed circuit board by securing at least two of the walls to the printed circuit board, whereby the miniature card is secured in place by positioning the forward portion of the miniature card between the overhang portion and the printed circuit board, and pivoting the rear portion of the miniature card downward until the latch mechanism engages the miniature card;

wherein the latch mechanism is slidably movable and further includes a plurality of miniature card retaining members which extend over a portion of the miniature card when the miniature card is inserted into the frame;

wherein the latch mechanism further includes a resilient spring member which, in the absence of a counter force, extends the plurality of miniature card retaining members over the portion of the miniature card when the miniature card is inserted into the frame;

wherein each of the plurality of miniature card retaining members includes a planar retaining surface abutted to a beveled edge, the beveled edge operating to contact the miniature card prior to insertion into the frame such that the spring member is compressed until the miniature card is fully inserted into the frame, whereupon the spring member forces the retaining members outward over the portion of the miniature card; and wherein the latch mechanism has a curved surface disposed between the plurality of retaining members such that application of sufficient counter force upon the curved surface compresses the spring member and pushes the miniature card retaining members away from the miniature card.

7. The device of claim 6 further including at least first and second guide posts formed on the latch mechanism and at least first and second corresponding guide slots formed on the frame such that the guide posts are disposed in the guide slots and the sliding motion of the latch mechanism is thereby limited to the direction and extent of the guide slots.

8. The device of claim 6 wherein the spring member is a flexible curvature with a central portion disposed between distal ends, the distal ends extending outwardly toward the rear wall of the frame.

9. The device of claim 6 wherein the frame includes at least first and second retainer hooks which securingly maintain the latch mechanism mounted on the frame.

10. The device of claim 6 wherein the resilient overhang portion is deflected by the miniature card when the miniature card is fully inserted into the frame, and force upon the forward portion of the miniature card by the overhang portion causes the rear portion of the miniature card to pop out of the frame when the latch is released.

11. The device of claim 6 further including first and second retainer members extending from the first and second sidewalls, respectively, the first and second retainer members each including a latch member disposed thereon such that the device can be secured to the printed circuit board by pre-drilling holes in the printed circuit board and inserting the retainer members therethrough.

12. The device of claim 6 further including a plurality of threaded holes formed in at least two walls of the forward wall, rear wall and sidewalls.

13. A device which facilitates mounting of a miniature card on a printed circuit board by securing forward and rear portions of the miniature card in place, comprising:

a docking port having a forward wall having first and second distal ends, first and second parallel sidewalls connected to the forward wall at the first and second distal ends thereof, respectively, a rear wall having first and second distal ends connected respectively to the first and second sidewalls such that the rear wall is substantially parallel with the forward wall, and a resilient overhang wall portion disposed between the forward wall and the first and second sidewalls on upper surfaces thereof;

an interface connector secured within the docking port to electrically connect the device to the printed circuit board, the interface connector including an elastomeric connection device with top and bottom surfaces and a plurality of electrical connections which provide electrical pathways between said top and bottom surfaces, and an electrically insulating body with an upper surface having an opening disposed therein, said opening adapted to receive said elastomeric connection device, said insulating body further adapted to be received by the host, and to receive the miniature card, such that the top surface of the elastomeric connection device comes into contact with, and is deflected by, the miniature card and the bottom surface of the elastomeric connection device comes into contact with, and is deflected by, the printed circuit board when the printed circuit board, interface connector and miniature card are interconnected; wherein the interface connector is partially shielded from above by the overhang wall portion once inserted into the docking port; and a latch mechanism mounted on the frame the docking port to secure the device within the docking port, the docking port being positioned on the printed circuit board by being secured to at least two of the walls to the printed circuit board, whereby the miniature card is secured in place by positioning the forward portion of the miniature card between the overhang portion and the top surface of the elastomeric connection device, and pivoting the rear portion of the miniature card downward until the latch mechanism engages the rear portion of the miniature card.

14. The device of claim 13 wherein the docking port includes at least first and second retainer hooks which securingly maintain the latch mechanism mounted on the docking port.

15. The device of claim 13 wherein the latch mechanism further includes a resilient spring member which, in the absence of a counter force, extends the at least one miniature card retaining member over a portion of the miniature card when the miniature card is inserted into the docking port.

16. The device of claim 15 wherein the at least one miniature card retaining member includes a planar retaining surface abutted to a beveled edge, the beveled edge operating to contact the miniature card prior to insertion into the docking port such that the spring member is compressed until the miniature card is fully inserted into the frame, whereupon the spring member forces the retaining member outward over the portion of the miniature card.

17. The device of claim 15 wherein the latch mechanism has two miniature card retaining members and a curved surface disposed therebetween such that application of counter force upon the curved surface compresses the spring member and pushes the miniature card retaining members away from the miniature card.

18. The device of claim 15 further including at least first and second guide posts formed on the latch mechanism and at least first and second corresponding guide slots formed on the docking port such that the sliding motion of the latch mechanism is limited to the direction and extent of the guide slots.

19. The device of claim 15 wherein the spring member is a flexible curvature with a central portion disposed between distal ends, the distal ends extending outwardly toward the rear wall of the docking port.

* * * * *

UNITED STATES PATENT AND TRADEMARK OFFICE
CERTIFICATE OF CORRECTION

PATENT NO.   : 5,816,838
DATED        : October 6, 1998
INVENTOR(S)  : Stephen D. Del Prete, et al.

It is certified that error appears in the above-identified patent and that said Letters Patent is hereby corrected as shown below:

Column 10,
Line 53, "overhand", should read -- overhang --;

Column 12,
Line 42, delete "the frame"; and

Column 12,
Line 67, "the frame", should read -- the docking port --.

Signed and Sealed this

Eighteenth Day of September, 2001

*Attest:*

NICHOLAS P. GODICI
*Attesting Officer*   *Acting Director of the United States Patent and Trademark Office*